United States Patent
Isenhour et al.

(10) Patent No.: US 10,101,545 B2
(45) Date of Patent: Oct. 16, 2018

(54) TRACEABLE CABLE ASSEMBLY AND CONNECTOR

(71) Applicant: Corning Optical Communications LLC, Hickory, NC (US)

(72) Inventors: Micah Colen Isenhour, Lincolnton, NC (US); Jerald Lee Overcash, China Grovbe, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/286,156

(22) Filed: Oct. 5, 2016

(65) Prior Publication Data
US 2017/0123167 A1 May 4, 2017

Related U.S. Application Data

(60) Provisional application No. 62/248,490, filed on Oct. 30, 2015.

(51) Int. Cl.
*G02B 6/38* (2006.01)
*G02B 6/44* (2006.01)
(Continued)

(52) U.S. Cl.
CPC ......... *G02B 6/3895* (2013.01); *G02B 6/0008* (2013.01); *G02B 6/262* (2013.01);
(Continued)

(58) Field of Classification Search
CPC .. G02B 6/3895; G02B 6/3885; G02B 6/3827; G02B 6/447; G02B 6/3887; G02B 6/262; G02B 6/0008
See application file for complete search history.

(56) References Cited

U.S. PATENT DOCUMENTS 3,942,859 A 3/1976 Korodi
4,412,936 A 11/1983 Khmelkov et al.
(Continued)

FOREIGN PATENT DOCUMENTS

CN 200941319 Y 8/2007
CN 201429706 Y 3/2010
(Continued)

OTHER PUBLICATIONS

International Searching Authority Invitation to Pay Additional Fees PCT/US2016/055497 dated Dec. 29, 2016.
(Continued)

*Primary Examiner* — Ryan Lepisto
(74) *Attorney, Agent, or Firm* — Robert L. Branham

(57) ABSTRACT

A connector for a traceable cable having a tracing optical fiber, and a cable assembly having the same. The connector includes a connector housing and a light pipe positioned at least partially within the connector housing. The light pipe has at least one tracing optical fiber interface configured to be optically coupled to the tracing optical fiber. The light pipe also has at least one tracer light interface optically accessible from outside of the connector housing. The light pipe defines an optical path configured to direct tracer light from the at least one tracing optical fiber interface to the at least one tracer light interface. The at least one tracer light interface is configured to receive and emit the tracer light directed by the optical path.

23 Claims, 7 Drawing Sheets

(51) Int. Cl.
*G02B 6/26* (2006.01)
*F21V 8/00* (2006.01)
(52) U.S. Cl.
CPC ......... *G02B 6/3827* (2013.01); *G02B 6/3846* (2013.01); *G02B 6/3885* (2013.01); *G02B 6/3887* (2013.01); *G02B 6/447* (2013.01)

(56) References Cited

U.S. PATENT DOCUMENTS

| | | |
|---|---|---|
| 4,466,697 A | 8/1984 | Daniel |
| 4,557,552 A | 12/1985 | Newton et al. |
| 4,637,686 A | 1/1987 | Iwamoto et al. |
| 4,755,018 A | 7/1988 | Heng et al. |
| 4,763,984 A | 8/1988 | Awai et al. |
| 4,923,274 A | 5/1990 | Dean |
| 4,995,691 A | 2/1991 | Purcell, Jr. |
| 5,006,806 A | 4/1991 | Rippingale et al. |
| 5,017,873 A | 5/1991 | Rippingale et al. |
| 5,040,867 A | 8/1991 | de Jong et al. |
| 5,122,750 A | 6/1992 | Rippingale et al. |
| 5,179,611 A | 1/1993 | Umeda et al. |
| 5,206,065 A | 4/1993 | Rippingale et al. |
| 5,305,405 A | 4/1994 | Emmons et al. |
| 5,329,348 A | 7/1994 | Nimura et al. |
| 5,333,228 A | 7/1994 | Kingstone |
| 5,377,292 A | 12/1994 | Bartling et al. |
| 5,394,496 A | 2/1995 | Caldwell et al. |
| 5,395,362 A | 3/1995 | Sacharoff et al. |
| 5,432,876 A | 7/1995 | Appeldorn et al. |
| 5,463,706 A | 10/1995 | Dumont et al. |
| 5,500,913 A | 3/1996 | Allen et al. |
| 5,591,160 A | 1/1997 | Reynard |
| 5,666,453 A | 9/1997 | Dannenmann |
| 5,741,152 A | 4/1998 | Boutros |
| 5,764,043 A | 6/1998 | Czosnowski et al. |
| 5,835,654 A | 11/1998 | Bergmann |
| 5,982,967 A | 11/1999 | Mathis et al. |
| 6,126,325 A | 10/2000 | Yamane et al. |
| 6,137,928 A | 10/2000 | Albrecht |
| 6,137,935 A | 10/2000 | Bohme et al. |
| 6,173,097 B1 | 1/2001 | Throckmorton et al. |
| 6,257,750 B1 | 7/2001 | Strasser et al. |
| 6,278,827 B1 | 8/2001 | Sugiyama et al. |
| 6,293,081 B1 | 9/2001 | Grulick et al. |
| 6,301,418 B1 | 10/2001 | Freier et al. |
| 6,311,000 B1 | 10/2001 | Schneider |
| 6,314,713 B1 | 11/2001 | Fitz et al. |
| 6,317,553 B1 | 11/2001 | Harper, Jr. et al. |
| 6,347,172 B1 | 2/2002 | Keller et al. |
| 6,356,690 B1 | 3/2002 | McAlpine et al. |
| 6,379,054 B2 | 4/2002 | Throckmorton et al. |
| 6,388,194 B1 | 5/2002 | Ryeczek |
| 6,403,947 B1 | 6/2002 | Hoyt et al. |
| 6,425,694 B1 | 7/2002 | Szilagyi et al. |
| 6,439,780 B1 | 8/2002 | Mudd et al. |
| 6,456,768 B1 | 9/2002 | Boncek et al. |
| 6,456,785 B1 | 9/2002 | Evans |
| 6,471,412 B1 | 10/2002 | Belenkiy et al. |
| 6,519,396 B2 | 2/2003 | Schneider et al. |
| 6,526,200 B1 | 2/2003 | Davie |
| 6,532,328 B1 | 3/2003 | Kline |
| 6,554,485 B1 | 4/2003 | Beatty et al. |
| 6,560,390 B2 | 5/2003 | Grulick et al. |
| 6,577,243 B1 | 6/2003 | Dannenmann et al. |
| 6,606,431 B2 | 8/2003 | Unsworth |
| 6,678,449 B2 | 1/2004 | Thompson et al. |
| 6,695,491 B1 | 2/2004 | Leeman et al. |
| 6,710,254 B2 | 3/2004 | Yueh |
| 6,712,524 B2 | 3/2004 | Beatty et al. |
| 6,728,453 B2 | 4/2004 | Petryszak |
| 6,798,956 B2 | 9/2004 | Morrison |
| 6,816,661 B1 | 11/2004 | Barnes et al. |
| 6,823,120 B2 | 11/2004 | Hurley et al. |
| 6,906,505 B2 * | 6/2005 | Brunet ............... H01R 13/7172 324/542 |
| 6,933,438 B1 | 8/2005 | Watts et al. |
| 6,969,273 B2 | 11/2005 | Chen |
| 6,979,223 B2 | 12/2005 | Chen |
| 6,995,565 B1 | 2/2006 | Tulloch et al. |
| 7,020,369 B2 | 3/2006 | Lodge, Jr. et al. |
| 7,029,137 B2 | 4/2006 | Lionetti et al. |
| 7,038,135 B2 | 5/2006 | Chan et al. |
| 7,049,937 B1 | 5/2006 | Zweig et al. |
| 7,090,411 B2 | 8/2006 | Brown |
| 7,121,707 B2 | 10/2006 | Currie et al. |
| 7,164,819 B2 | 1/2007 | Jenson et al. |
| 7,217,152 B1 | 5/2007 | Xin et al. |
| 7,221,284 B2 | 5/2007 | Scherer et al. |
| 7,242,831 B2 | 7/2007 | Fee |
| 7,313,304 B2 | 12/2007 | Andrews et al. |
| 7,401,961 B2 | 7/2008 | Longatti et al. |
| 7,406,231 B1 | 7/2008 | Beck et al. |
| 7,433,565 B2 | 10/2008 | Joseph et al. |
| 7,524,082 B2 | 4/2009 | North |
| 7,544,909 B2 | 6/2009 | Dhir |
| 7,572,066 B2 | 8/2009 | De Jong et al. |
| 7,596,293 B2 | 9/2009 | Isenhour et al. |
| 7,603,020 B1 | 10/2009 | Wakileh et al. |
| 7,618,175 B1 | 11/2009 | Hulse |
| 7,653,277 B2 | 1/2010 | Andrews et al. |
| 7,671,279 B2 | 3/2010 | Yin |
| 7,748,860 B2 | 7/2010 | Brunet |
| 7,817,884 B2 | 10/2010 | Demeritt et al. |
| 7,920,764 B2 | 4/2011 | Kewitsch |
| 7,932,805 B2 | 4/2011 | Darr et al. |
| 7,948,226 B2 | 5/2011 | Rathbun, II et al. |
| 8,000,576 B2 | 8/2011 | Chen et al. |
| 8,102,169 B2 | 1/2012 | Law et al. |
| 8,150,227 B2 | 4/2012 | Kewitsch |
| 8,152,385 B2 | 4/2012 | De Jong et al. |
| 8,167,471 B1 | 5/2012 | Moritz |
| 8,314,603 B2 | 11/2012 | Russell |
| 8,322,871 B1 | 12/2012 | Knaggs et al. |
| 8,331,752 B2 | 12/2012 | Biribuze et al. |
| 8,408,029 B2 | 4/2013 | De Angelis et al. |
| 8,414,319 B2 | 4/2013 | Patel et al. |
| 8,428,405 B2 | 4/2013 | Kewitsch |
| 8,492,448 B2 | 7/2013 | Dewa et al. |
| 8,509,579 B2 | 8/2013 | Martin-Lopez |
| 8,545,076 B2 | 10/2013 | Bickham et al. |
| 8,548,293 B2 | 10/2013 | Kachmar |
| 8,582,939 B2 | 11/2013 | Gimblet et al. |
| 8,582,940 B2 | 11/2013 | Abernathy et al. |
| 8,591,087 B2 | 11/2013 | Bickham et al. |
| 8,620,123 B2 | 12/2013 | Dean, Jr. et al. |
| 8,620,125 B2 | 12/2013 | Button et al. |
| 8,683,827 B2 | 4/2014 | De Angelis et al. |
| 8,708,724 B2 | 4/2014 | Patel et al. |
| 8,724,842 B2 | 5/2014 | Sumitani et al. |
| 8,724,942 B2 | 5/2014 | Logunov et al. |
| 8,770,525 B2 | 7/2014 | Donaldson et al. |
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco |
| 9,196,975 B2 * | 11/2015 | Scherer ................. H01R 9/032 |
| 9,213,151 B2 * | 12/2015 | Lin ..................... G02B 6/3895 |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |

(56) References Cited

U.S. PATENT DOCUMENTS

| | | |
|---|---|---|
| 9,529,167 B2 | 12/2016 | Wu |
| 9,541,694 B2 | 1/2017 | Tissot |
| 9,709,750 B1 | 7/2017 | Kuang et al. |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee et al. |
| 2006/0140562 A1 | 6/2006 | Joseph et al. |
| 2006/0193575 A1 | 8/2006 | Greenwood et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Moon et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1 | 8/2013 | Dean, Jr. et al. |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinisky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0214746 A1 | 7/2015 | Lopez et al. |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1 | 10/2016 | Chomycz |
| 2016/0313513 A1 | 10/2016 | Wijbrans et al. |
| 2016/0377818 A1 | 12/2016 | Tong et al. |
| 2017/0207585 A1 | 7/2017 | Butler et al. |
| 2018/0128996 A1 | 5/2018 | Sawicki et al. |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 0011484 A1 | 3/2000 |
| WO | 02095289 A1 | 11/2002 |
| WO | 2005106899 A1 | 11/2005 |
| WO | 2006044177 A2 | 4/2006 |
| WO | 2007053371 A1 | 5/2007 |
| WO | 2008048955 A1 | 4/2008 |
| WO | 2010011299 A2 | 1/2010 |
| WO | 2010021896 A1 | 2/2010 |
| WO | 2011063214 A1 | 5/2011 |
| WO | 2013055842 A1 | 4/2013 |
| WO | 2013059811 A1 | 4/2013 |
| WO | 2014026300 A1 | 2/2014 |
| WO | 2015000194 A1 | 1/2015 |

OTHER PUBLICATIONS

Endruweit et al. "Spectroscopic experiments regarding the efficiency of side emission optical fibres in the UV-A and visible blue spectrum", Optics and Lasers in Engineering 46 (2008) pp. 97-105.
International Search Report and Written Opinion PCT/US2017/012899 dated Mar. 9, 2017.
International Search Report and Written Opinion PCT/US2013/025262 dated Jul. 16, 2013.
International Search Report and Written Opinion PCT/US2016/042414 dated Oct. 5, 2016.
International Searching Authority Invitation to Pay Additional Search Fees PCT/US2016/042416 dated Oct. 7, 2016.
Rajesh, "Fabrication and Characterisation of polymer optical fibers for smart sensing and optical amplification" 2011. ch 1. pp. 1-38. XP002695623.
Schott AG: "Schott SpectraStream Glass Harnesses", (2006) p. 1-2 XP002695625.
Spigulis, "Side-Emitting Fibers Brighten Our World", Optics and Photonics News, vol. 16 No. 10 (2005) p. 34-39 XP002695624.

(56) References Cited

OTHER PUBLICATIONS

European Search Report EP15168466 dated Dec. 17, 2015.
International Search Report and Written Opinion PCT/US2014/041510 dated Sep. 18, 2014.
International Search Report and Written Opinion PCT/US2014/049524 dated Jan. 20, 2015.
International Search Report and Written Opinion PCT/US2014/049525 dated Jan. 23, 2015.
International Search Report and Written Opinion PCT/US2015/060558 dated Feb. 9, 2016.
International Search Report and Written Opinion PCT/US2016/020542 dated Jun. 7, 2016.
"Side Emitting Super Glowing Fiber." MeshTel.com. MeshTel-Intelite, Inc., 1996-2012. Web. Aug. 1, 2013.
Kremenakova, et al., "Characterizaion of Side EmmittingPolymeric Optical Fibres," Jounal of Fiber Bioengineering & Informatics 5:4 (2012). pp. 423-431, http://www.jfbi.org, Dec. 2012.
"Super Vision SV84 Fiber Optics Side Glow Cable," TriN01ihLighting.com, Tri North Lighting, Inc., n. d., Web. Aug. 1, 2013.
U.S. Appl. No. 13/431,565, filed Mar. 27, 2012, David L. Dean, Jr., 32 pages.
U.S. Appl. No. 14/295,844, Bookbinder filed Jun. 4, 2014, 25 pages.
Optical fiber with nanostructured cladding of TiO2 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Anonymous: "Diode Lasers, Fiber optics, IR, Red, Green, Blue Diode Lasers, Laser Diode, Fiber Illuminators, Fiber Optics Coupler, Galvonameters, Laser Show Accessories", 2013 http://www.meshtel.com XP055161859.
U.S. Appl. No. 62/193,638, U.S. Appl. No. 62/221,769 Listed in ID as 26113.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/031624 dated Aug. 31, 2016.
"Specifications of our fiber optic cable", Internet Citation, 2001, http//www.fiberopticproducts.com/specs.htm XP002431080.

\* cited by examiner

TRACEABLE CABLE ASSEMBLY AND CONNECTOR

CROSS REFERENCE TO RELATED APPLICATIONS

This application claims the benefit of priority of U.S. Provisional Application Ser. No. 62/248,490, filed Oct. 30, 2015, the content of which is relied upon and incorporated herein by reference in its entirety.

BACKGROUND

This disclosure generally relates to traceable cable assemblies and systems. More particularly, the present disclosure relates to traceable cable assemblies and systems provided with launch points to facilitate traceability.

Computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade, or other moves and changes. To ensure the continued proper operation of each network, the maze of cables connecting the individual components must be precisely understood and properly connected between specific ports.

In many cases, a data center's cables, often called patch cords, are required to bridge several meters across the data center. The cables may begin in one equipment rack, run through the floor or other conduit, and terminate at a component in a second equipment rack.

As a result, there is a need for an improved cable or cable assembly that allows a select cable to be quickly and easily traceable for the purpose of identifying an approximate terminal end of a given cable that is being replaced, relocated, or tested. Particularly, there is a need for a launch point that allows for tracer light to be effectively coupled into and out of the cable to facilitate tracing.

SUMMARY

One embodiment relates to a cable assembly. The cable assembly comprises a traceable cable and at least one connector coupled to an end of the traceable cable. The traceable cable comprises at least one data transmission element, a jacket at least partially surrounding the at least one data transmission element, and a tracing optical fiber incorporated with and extending along at least a portion of a length of the traceable cable. The tracing optical fiber includes a core having a first index of refraction and a cladding with a second index of refraction. The at least one connector comprises a connector housing and a light pipe positioned at least partially within the connector housing. The light pipe comprises at least one tracing optical fiber interface optically coupled to the tracing optical fiber and at least one tracer light interface optically accessible from outside of the connector housing. The light pipe defines an optical path configured to direct tracer light from the at least one tracing optical fiber interface to the at least one tracer light interface, and wherein the at least one tracer light interface is configured to receive and emit the tracer light directed by the optical path.

Another embodiment relates to a connector for a traceable cable having a tracing optical fiber. The connector includes a connector housing and a light pipe positioned at least partially within the connector housing. The light pipe comprises at least one tracing optical fiber interface configured to be optically coupled to the tracing optical fiber. The light pipe also comprises at least one tracer light interface optically accessible from outside of the connector housing. The light pipe defines an optical path configured to direct tracer light from the at least one tracing optical fiber interface to the at least one tracer light interface. The at least one tracer light interface is configured to receive and emit the tracer light directed by the optical path.

Yet another embodiment relates to a traceable cable. The traceable cable has at least one data transmission element, a jacket at least partially surrounding the at least one data transmission element, and a tracing optical fiber incorporated with and extending along at least a portion of a length of the cable. The tracing optical fiber includes a core having a first index of refraction and a cladding with a second index of refraction. The traceable cable also includes at least one launch point for optically accessing the tracing optical fiber. The launch point comprises a light pipe. The light pipe comprises a tracing optical fiber interface optically coupling the light pipe to the tracing optical fiber and at least one tracer light interface optically accessible from outside of the traceable cable. The light pipe defines an optical path configured to direct tracer light from the at least one tracing optical fiber interface to the at least one tracer light interface. The at least one tracer light interface is configured to receive and emit the tracer light directed by the optical path. Furthermore, the optical path has at least one turn.

A light pipe in use with a traceable cable or traceable cable assembly as described herein may provide one or more advantages. For example, the light pipe may allow tracer light to be turned or redirected in tight spacing through a small radius of curvature as the tracer light travels from a light source to a tracing optical fiber. The light pipe may also be constructed to provide manufacturing and assembly advantages compared to the use of tracing optical fiber alone.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DESCRIPTION

Figure 1:
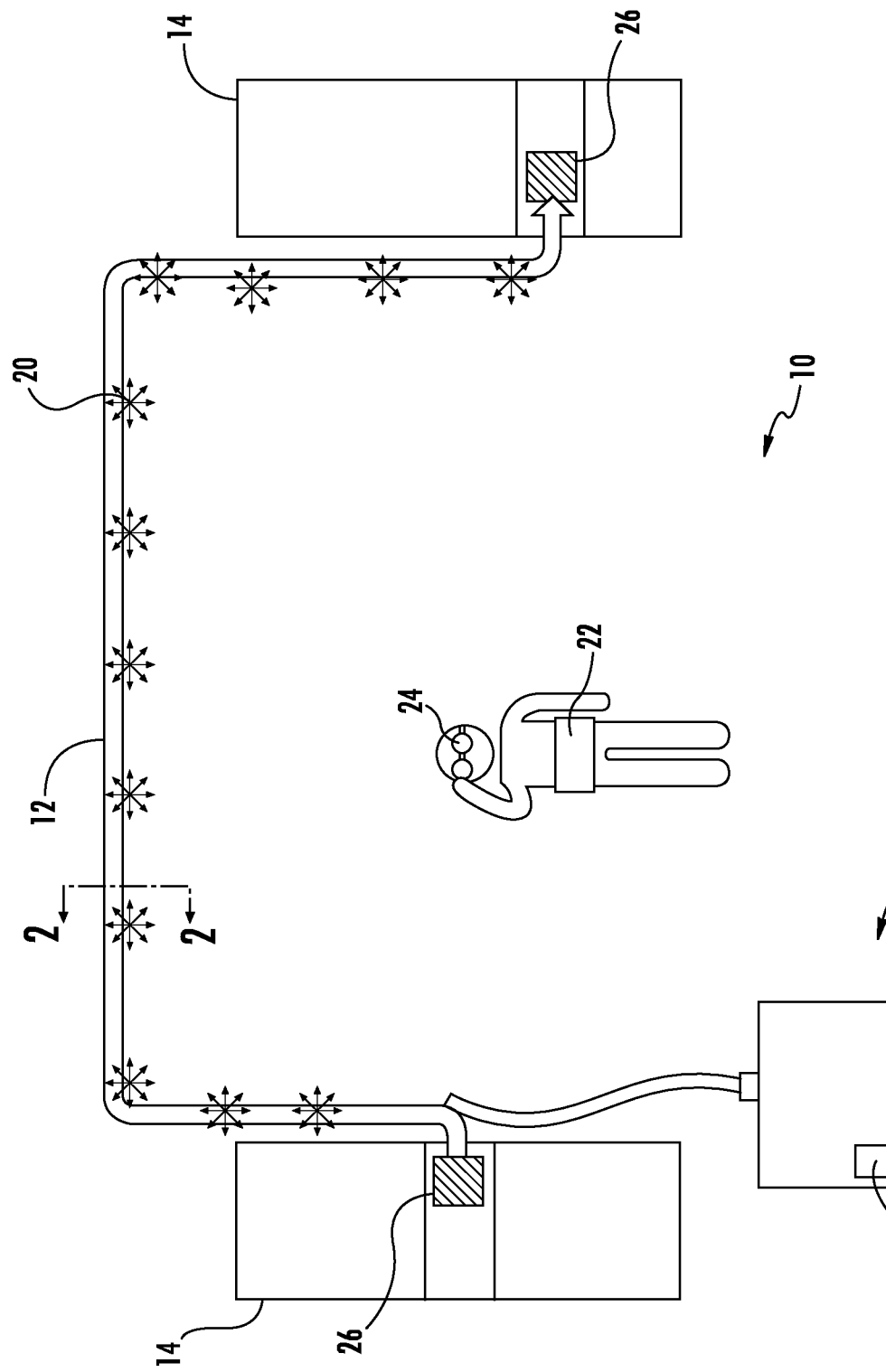
FIG. 1 is a schematic view of a system that includes a traceable cable assembly, in accordance with an embodiment of the present disclosure.

Various embodiments will be further clarified by examples in the description below. In general, the description relates to traceable cable assemblies and components thereof. More particularly, this disclosure provides various embodiments that include light pipes for providing light into, and/or emitting light received from, an optical fiber, for example a tracing optical fiber within a traceable cable.

In several embodiments, the light pipe may be formed from a solid body of transparent material. The light pipe may additionally or alternatively be formed of translucent material. Between predetermined portions of the light pipe (e.g., between opposite ends or terminus surfaces), the light pipe may operate under the principles of total internal reflection at the boundaries between the light pipe and adjacent medium(s) (e.g., air), so that the light pipe can transmit light, such as tracer light (i.e., light used during tracing operations of the cable assembly), from one portion of the light pipe to another portion of the light pipe along an optical path. Light pipes of the present disclosure may function as intermediaries between, for example, the ambient environment and a tracing optical fiber within a traceable cable. As another example, light pipes of the present disclosure may be configured to convey tracer light from a source to the tracing optical fiber, and from the tracing optical fiber to an emission location where the tracer light is visible near a terminal end of a cable assembly. Embodiments of light pipes are discussed in greater detail below after a discussion of an exemplary tracing system where such light pipes may be used.

An Example Optical Fiber Tracing System

A problem that occurs in data centers or similar network locations is congestion and clutter caused by large quantities of cables. Network operators frequently desire to change connections to accommodate moves, adds, and changes in the network. However, such congestion makes it difficult to trace a particular cable from the source to the receiver, which may be required to perform the moves, adds, and changes in the network.

The various embodiments described herein may be incorporated into a tracing system that makes the process of performing a trace or otherwise identifying a cable in a congested environment simple and fast for a technician. As a result, the technician can reliably identify the one cable in question (which may be a telecommunication patch cord) from amongst many other cables (which may also be telecommunication patch cords). In some cases, the service technician may be able to reliably identify the cable in question along its length once tracing capability at one end of the cable has been activated. The tracing system may also have the advantage of being an optically-activated tracing system using only passive tracing elements within the cable (although active tracing elements may still be provided in addition to the passive tracing elements, if desired). The act of tracing may involve tracing a cable based upon an optical signal or stimulus, for example, a visible spot of light that is provided by a source external to the cables themselves. The source external to the cables may alternatively provide non-visible light for tracing purposes.

An example of a tracing system 10 is schematically illustrated in FIG. 1. The tracing system 10 includes a traceable cable 12 (hereinafter "cable 12") extending between two locations, such as two equipment racks 14 in a data center, telecommunications room, or the like. The cable 12 may, for example, operably connect a port on a server in one of the equipment racks 14 with a port on a server in another of the equipment racks 14.

The tracing system 10 may also include a launch tool 16 configured to connect to, or otherwise be associated with, the cable 12 and provide tracer light from a light source 18. The tracer light may provide illumination at discrete points along the cable 12. Such discrete points are represented by element 20 in FIG. 1 and will be referred to herein as emission points 20 or tracer locations 20. In alternative embodiments, the cable 12 may be configured to provide more continuous emission along its length, or illumination only at or near ends of the cable 12.

The tracing system 10 may further comprise a controller 22 and an observation tool 24. The controller 22, in the embodiment shown, is a remote control unit configured to communicate with the launch tool 16. A technician may, for example, use the controller 22 to send operational commands to the launch tool 16 to control operation of the light source 18. The observation tool 24 may comprise a pair of glasses configured to enhance visibility of the tracer light emitted by the cable 12. This may be achieved by enhancing visibility of the wavelength of the tracer light and/or by dampening other visible wavelengths. In embodiments where the tracer light has a non-visible wavelength, the observation tool 24 may include sensors configured to detect such light and electronics configured to display a representation of such light to a technician.

The cable 12 in this embodiment is part of a cable assembly that includes a connector 26 schematically illustrated in FIG. 1 on each end of the cable 12. The connectors 26 may be present on each opposite end of the cable 12 to allow the cable assembly to act as a telecommunications patch cord between different components of a network. The connectors 26 may vary widely depending on the nature of the cable 12 (e.g., the quantity and type of signals transmitted) and the components being connected. The distance between the connectors 26 on opposite ends of the cable 12 may define a length of the cable. The length of the cable 12 may be at least about 1 meter or even several tens of meters, such as thirty meters or more, depending on the intended use of the cable 12.

Figure 2:
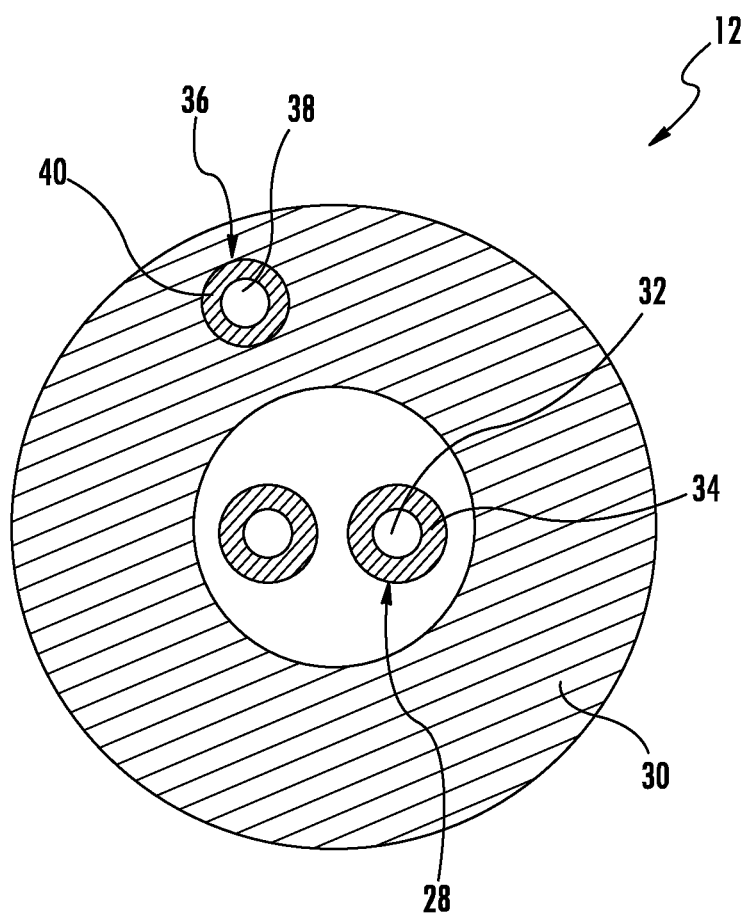
FIG. 2 is a transverse cross sectional view of a traceable cable of the traceable cable assembly FIG. 1, in accordance with an embodiment of the present disclosure.

FIG. 2 is a cross section of the cable 12 in accordance with one possible embodiment. As shown in FIG. 2, the cable 12 includes at least one data transmission element 28 and a jacket 30 surrounding the at least one data transmission element 28. Although two data transmission elements 28 are shown in this embodiment, there may be a single data transmission element or a larger plurality of data transmission elements within the jacket 30. In general, the data transmission element 28 is a structure capable of carrying a data signal from one end of the cable 12 to the other end of the cable. For example, the data transmission element 28 may be configured to transmit an electrical signal using a copper wire or other electrically conductive material. Alternatively, the data transmission element 28 may be configured to transmit an optical signal by conducting electromagnetic waves to carry data from one location to another. The data transmission element 28 shown in FIG. 2 is of the latter type (i.e., an optical transmission element) having a core 32 and a cladding 34. There may be strength members (e.g., aramid yarns) or other elements located within the cable 12 between the data transmission elements 28 and the jacket 30.

Still referring to FIG. 2, the cable 12 further includes at least one tracer element, which is shown in the form of a tracing optical fiber 36 (also referred to as a "tracer optical fiber 36") configured to transmit and emit tracer light for visualization purposes. The tracing optical fiber 36 may be incorporated as part of the cable 12 in several configurations. In the embodiment shown in FIG. 2, the tracing optical fiber 36 is embedded within a portion of the jacket 30. In other embodiments, the tracing optical fiber 36 may be adjacent to the data transmission element 28, inside a conduit defined by the jacket 30. In yet other embodiments, the tracing optical fiber 36 may be provided on, mounted to, or otherwise attached to an outside of the jacket 30.

The tracing optical fiber 36 includes a core 38 having a first index of refraction, and a cladding 40 at least partially surrounding the core 38. The cladding 40 has a second index of refraction different than the first index of refraction. The tracing optical fiber 36 may be configured to emit light at ends of the tracing optical fiber 36 and/or along the length of the tracing optical fiber 36 in a continuous or periodic manner. The tracing optical fiber 36 may, for example, include features or otherwise be configured to scatter light at discrete locations along the length of the tracing optical fiber 36. Such periodic scattering of light may form the emission points 20 (FIG. 1) of the cable 12, alone or in combination with features on the jacket 30, such as openings/windows (not shown) in the jacket 30 or portions of reduced material thickness between the tracing optical fiber 36 and an outer surface of the jacket 30. The term "side-emitting optical fiber" may be used to refer to the tracing optical fiber 36 in embodiments where light is scattered along the length of the tracing optical fiber 36 in a periodic or continuous manner.

As mentioned above, the tracer light emitted by the tracing optical fiber 36 may be provided by the launch tool 16 (FIG. 1). In one embodiment, the light source 18 may be a semiconductor laser emitting green light at a wavelength between 510-540 nm. Alternatively, other colors/wavelengths may be emitted, such as red light from approximately 620-650 nm. In other embodiments, non-laser light sources may be used, such as light emitting diodes (LEDs). Determining the light source 18 may involve consideration, evaluation, and testing of several factors, including visibility, cost, eye safety, peak power, power consumption, size, and commercial availability.

An Example Connector

Figure 3:
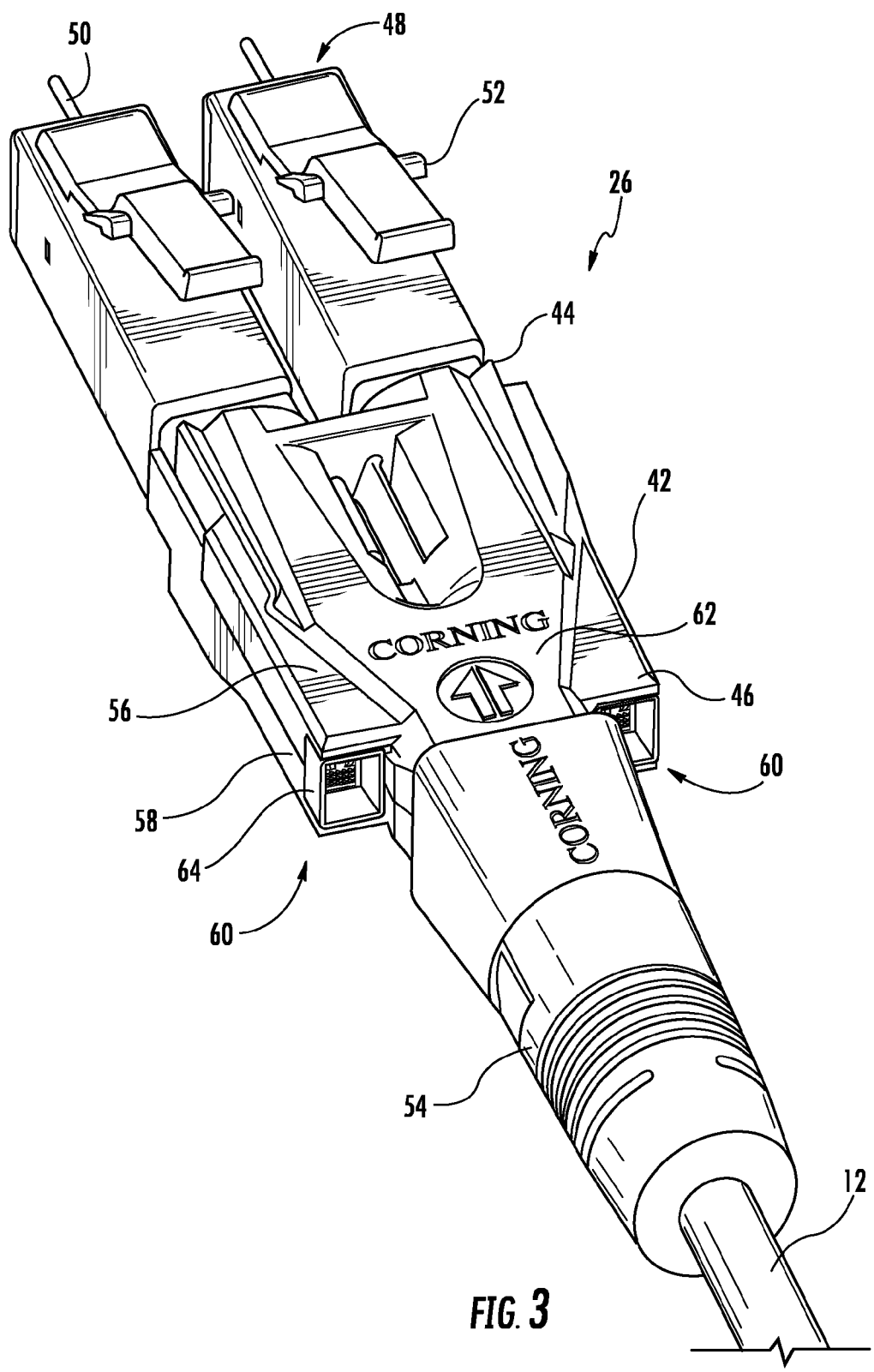
FIG. 3 is a perspective view of a portion of the traceable cable assembly of FIG. 1 according to one embodiment.

FIG. 3 is a perspective view of one end of a cable assembly according to one embodiment. The illustrated cable assembly includes a connector 26, for example a duplex LC fiber optic connector, and a traceable cable 12 having a pair of data transmission elements 28 as shown in FIG. 2.

The connector 26 may have a connector housing 42 with a first end 44 and a second end 46. The connector 26 includes a pair of fiber optic connector sub-assemblies ("connector sub-assemblies") 48 operably supported by the first end 44 of the connector housing 42. The connector sub-assemblies 48 may include respective ferrules 50 configured to support respective ends of the data transmission elements 28 (FIG. 2). The ferrules 50 may be operably supported within the connector sub-assemblies 48 and operatively joined to ends of the data transmission elements 28 by any suitable structure and method known in the art. In the example shown, the connector sub-assemblies 48 are LC fiber optic connector sub-assemblies with respective levers 52 or other suitable features for engaging and disengaging with elements within the equipment racks 14 (FIG. 1), adapters, or the like.

The second end 46 of the connector housing 42 may be connected to the traceable cable 12. A flexible boot 54 may be provided at the second end 46 to at least partially facilitate or otherwise be associated with a connection between the connector housing 42 and the cable 12. The flexible boot 54 is configured to prevent sharp bends in the cable 12 where the cable engages the connector housing 42 as commonly used in the art.

The connector housing 42 may include an upper housing 56 and a lower housing 58. The terms "upper" and "lower" are used for ease of understanding relative to FIG. 3, but are not intended to limit the construction of the connector 26. In an example, the upper housing 56 and the lower housing 58 are configured to mate with one another to form the connector housing 42. An example of such mating features for the connector housing 42 may be configured to provide a snap-fit connection and/or any other suitable connection. In an example, the lower housing 58 may have one or more locking features that snap fit with a corresponding locking feature of the upper housing 56. Alignment features may also be provided inclusive of or separate from the locking features to ensure that the upper housing 56 and lower housing 58 are able to fit together in the correct orientation.

A launch point 60 may be provided at one or more portions of the connector 26, particularly the connector housing 42. The launch point 60 is configured to provide optical access to the tracing optical fiber 36 and emit tracer light received from the tracing optical fiber 36. In FIG. 3, two launch points 60 are show, each including an opening through the connector housing 42 created between the upper housing 56 and the lower housing 58. The illustrated launch points 60 are located on the front of the connector housing 42, opposite the connector sub-assemblies 48. This location may provide beneficial spacial access to the launch points 60 when the connector sub-assemblies 48 are engaged with other components, e.g. ports. In other words, this location may be readily accessible for the launch tool 16 (FIG. 1). Locating the launch points 60 on the front of the connector 26, facing away from the connector sub-assemblies 48 may position the launch points in a region that is highly visible when the connector 26 is engaged with a port, adaptor, or the like.

In other embodiments, some or all of the connector housing 42 may be transparent or translucent to allow optical access for tracer light into and out of the connector 26. A transparent connector housing 42 may allow substantially all of the connector housing 42 to function at least partially as a launch point 60. In the embodiment of FIG. 3, the upper housing 56 is provided with indicia 62 that may be created by cut-out portions formed through the upper housing 56. These indicia 62 may be included as part of the one or more launch points 60 for each connector 24.

Light Pipes

Figure 4:
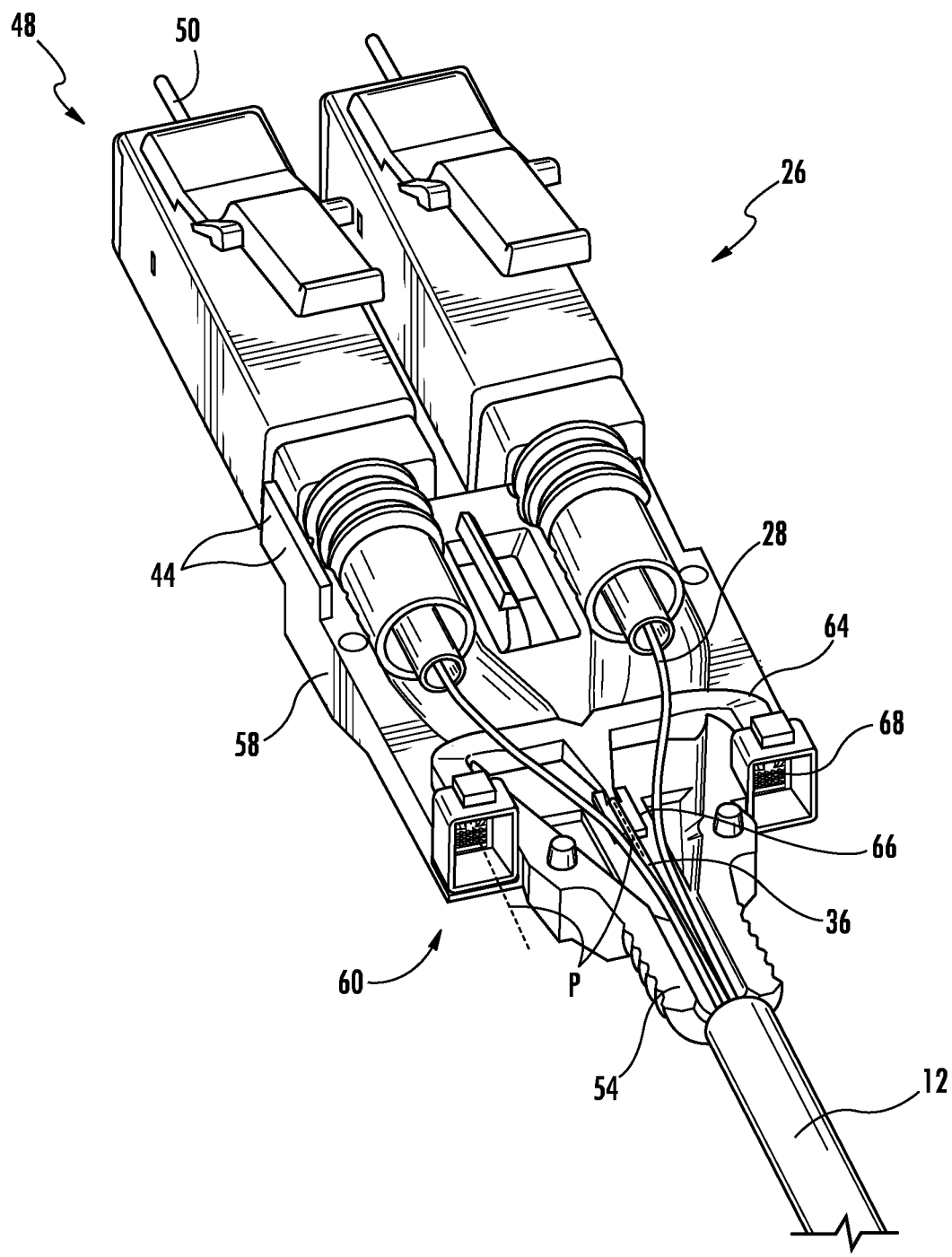
FIG. 4 is like FIG. 3, except that an upper housing and boot have been removed.

One or more of the launch points 60 may be associated with, may include, may be parts of, or may be defined by at least one light pipe 64 that is discussed in the following paragraphs, beginning with reference to FIG. 4. In FIG. 4, the upper housing 56 (FIG. 3) and boot 54 (FIG. 3) have been removed to reveal an interior of the connector housing 42 and more clearly show the light pipe 64 of the connector 26. In the embodiment of FIG. 4, the light pipe 64 is positioned at least partially within the connector housing 42 and forms at least a portion of each launch point 60.

The light pipe 64, according to the illustrated embodiment, comprises a solid body of transparent material that at least partially defines at least one tracing optical fiber interface 66 (FIG. 5) optically coupling the light pipe to an end of the tracing optical fiber 36. The solid body also at least partially forms the launch points 60 by predetermined portions of the light pipe 64 at least partially defining tracer light interfaces 68 that are optically exposed from, or optically accessible through, the connector housing 42. The tracer light interfaces 68 may, for example, be defined by terminus surfaces of the light pipe 64. The solid body of the light pipe 64 further defines an optical path P configured to direct tracer light from the at least one tracing optical fiber interface 66 to the at least one tracer light interface 68. In many embodiments, the optical path P is bi-directional, such that the optical path is configured to also direct tracer light from the at least one tracer light interface 68 to the at least one tracing optical fiber interface 66.

Figure 5:
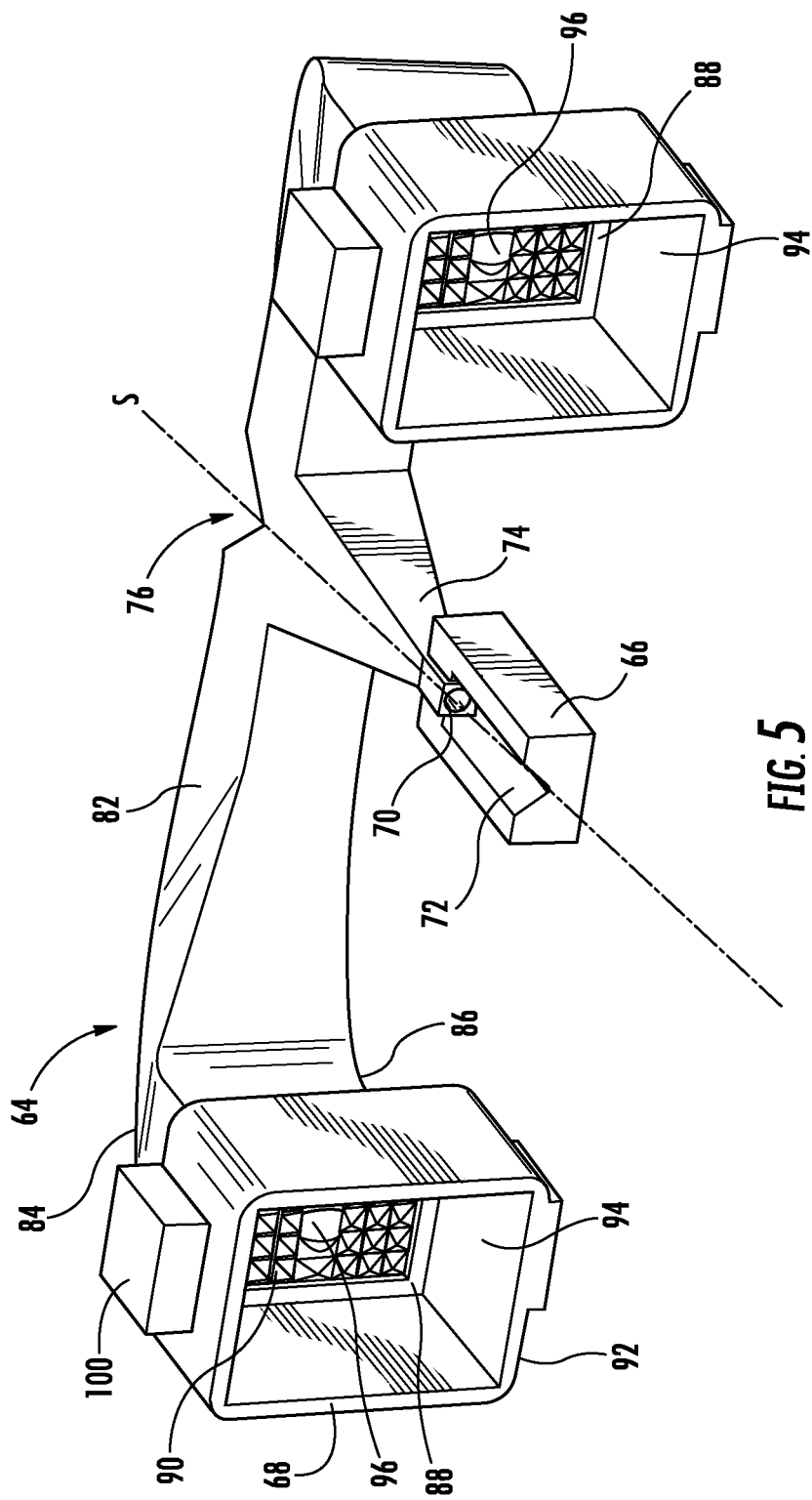
FIG. 5 is a perspective view of an example light pipe usable within a traceable cable assembly of the present disclosure.
Figure 6:
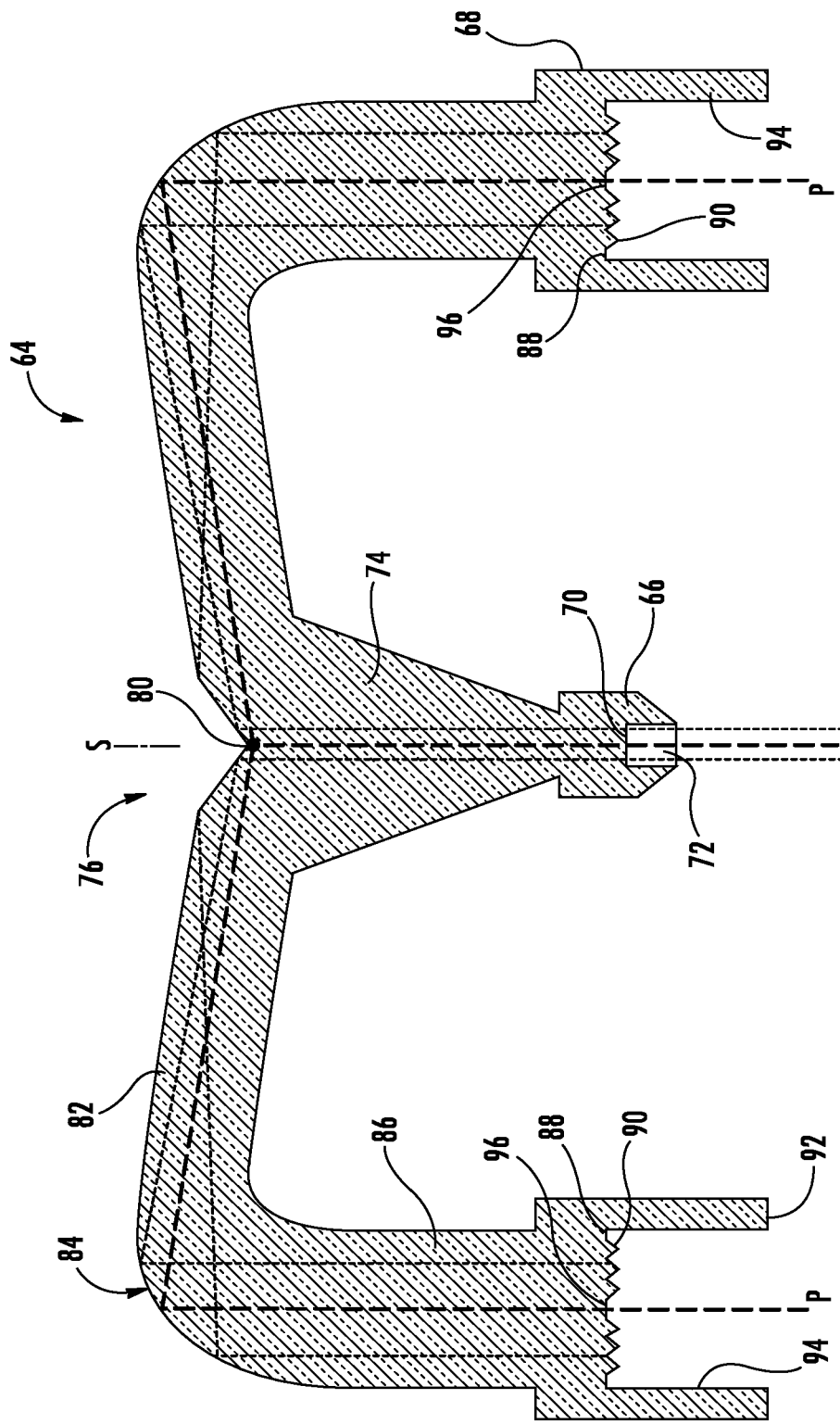
FIG. 6 is a horizontal cross section of the light pipe shown in FIG. 5.

FIGS. 5 and 6 illustrated the light pipe 64 of FIG. 4 in further detail. Suitable materials for the solid body of transparent material may include transparent polymers and glass. In one example, the transparent material is a molded plastic. The light pipe 64 may be substantially uncoated or free from cladding. Thus, the light pipe 64 may transmit the tracer light along the optical path P using solely or primarily total internal reflection that may be at least partially caused by the difference in the index of refraction between the transparent material of the light pipe 64 and the environment (e.g., air) surrounding the light pipe. In one embodiment, the light pipe 64 is configured to minimize loss of (e.g., emission of) tracer light from the peripheral surfaces of the light pipe that are positioned between the optical fiber interface 66 and the tracer light interface 68 so that the light pipe conveys as much of the tracer light as possible from the optical fiber interface 66 to the tracer light interface(s) 68, and vice versa. In this regard, in FIG. 6, rays are schematically represented by dashed lines and are generally representative of a beam of tracer light following the optical path P.

Still referring to FIG. 6, the light pipe 64 in the embodiment shown is substantially symmetric about symmetry axis S. As such, the light pipe 64 has two substantially similar optical paths P, only one of which will now be described in detail. Reiterating from above, the illustrated optical path P is bi-directional; therefore, the order in which the sequence is described in the following could be reversed.

The tracing optical fiber interface 66 of the light pipe 64 may include a boundary 70 that is a predetermined portion or terminus surface of the transparent body of the light pipe. An end of the tracing optical fiber 36 (FIG. 4) may be in opposing face-to-face contact with or otherwise in optical communication with the boundary 70, and the light pipe 64 may be configured to receive tracer light from the adjacent end of the tracing optical fiber 36 through the boundary 70 and/or emit tracer light from the boundary 70 into the adjacent end of the tracing optical fiber 36. The light pipe 64 and the boundary 70 may be configured so that tracer light passes through the boundary with substantially no reflection.

The tracing optical fiber interface 66 may also include an alignment channel 72 that is shown in FIG. 5 as being an upwardly open v-shaped groove or receptacle defined in the transparent body of light pipe 64, or defined in a block or other structure mounted to or otherwise appropriately associated with the light pipe. The alignment channel 72 may be configured to help align an end of the tracing optical fiber 36 (FIG. 4) with the boundary 70. This alignment feature may simplify assembly and reduce the time for assembling the cable 12 with the connector 26. The end of the tracing optical fiber 36 may be optically coupled and/or fixedly joined to the boundary 70 by any suitable method that allows tracer light to pass from the tracing optical fiber to the light pipe 64 and also from the light pipe to the tracing optical fiber 36 via the boundary 70. Example methods of joining the light pipe 64 and the tracing optical fiber 36 include creating an adhesive bond (e.g., by using index matched adhesives) between the tracing optical fiber 36 and the boundary 70. Other methods for joining the tracing optical fiber 36 to the tracing optical fiber interface 66 include a ferrule connection, a sleeve, or a bore for accepting an end of the tracing optical fiber 36.

Traveling along the optical path P, the tracing optical fiber interface 66, or more specifically the boundary 70, leads to a first conduit portion 74. The first conduit portion 74 is shown with a rectangular cross section whose cross sectional area increases in a direction moving away from the tracing optical fiber interface 66. The peripheral surfaces defining the first conduit portion 74 do not significantly interact with tracer light, if at all, as schematically shown in FIG. 6. Alternatively, there may be interaction in the form of total internal reflection.

The first conduit portion 74 then leads to a first transition portion 76 that may include a reflection surface that turns the optical path P through use of total internal reflection. In this embodiment, the first transition portion 76 includes a pair surfaces angled with respect to one another, and whose common edge 80 may bisect the beam of tracer light following the optical path P to form an optical splitter, dividing the optical path P into a pair of optical paths so that tracer light may be conducted to each of the tracer light interfaces 68. The optical splitter of the first transition portion 76 is typically bi-directional, i.e. able to operate in reverse, such that if tracer light were provided into each of the tracer light interfaces 68, the tracer light could be joined by the optical splitter and directed toward the single tracing optical fiber interface 66.

Still referring to FIG. 6, the first transition portion 76 leads to a second conduit portion 82. Like the first conduit portion 74, the second conduit portion 82 is shown as having a substantially rectangular cross section whose size is increasing in a direction away from the tracing optical fiber interface 66. In one embodiment, the peripheral walls defining the second conduit portion 82 do not significantly (or even not at all) interact with tracer light traveling along the optical path P. Alternatively, there may be interaction in the form of total internal reflection.

The light pipe 64 in FIG. 6 then includes a second transition portion 84 where the optical path P, and tracer light traveling therealong, is again bent or turned. The second transition portion 84 is shown as a curved bend of such radius configured to maintain a large percentage of the tracer light within the light pipe 64 through use of total internal reflection. In other embodiments, such as the one shown in FIG. 7, the second transition portion 84 may be a planar surface configured to turn the optical path P. The second transition portion 84 turns the optical path P though a third conduit portion 86 before arriving at the tracer light interface 68. Again, the third conduit portion 86 provides a medium for the passage of tracer light, and may be intended to have little impact on the retention or direction of tracer light because the beam of tracer light may have minimal, if any, interaction with the peripheral walls of the third conduit portion. Alternatively, there may be interaction in the form of total internal reflection.

Additional details on the tracer light interfaces 68 will now be provided. The tracer light interfaces 68 of the light pipe 64 may have two functions. First, the tracer light interface 68 may provide a region of the light pipe 64 that is optically accessible to the launch tool 16 (FIG. 1) so that tracer light may be launched into the light pipe 64 through the tracer light interface 68. The light pipe 64 is configured such that at least some of the tracer light launched into the light pipe 64 via the tracer light interface 68 will be routed to and pass through the boundary 70 of the tracing optical fiber interface 66 to be transmitted along the tracing optical fiber 36. Second, at least some of the tracer light that originates from the tracing optical fiber 36 and is received by the light pipe 64 at the boundary 70 of the tracing optical fiber interface 66 may be emitted from the light pipe 64 at the tracer light interface 68. The tracer light emitted from the tracer light interface 68 may be visible outside of the connector housing 42 for identification of an end of the cable assembly by a technician.

The tracer light interface 68 includes a boundary surface 88 through which tracer light may be received and emitted. In the illustrated embodiment, the boundary surface 88 is a predetermined portion or terminus surface of the transparent body of the light pipe 64, and the boundary surface 88 is exposed to the ambient environment. The light pipe 64 and the boundary surface 88 may be configured so that tracer light passes through the boundary surface with substantially no reflection.

The boundary surface 88 may comprise a plurality of diffusive protrusions 90, such as prisms or the like, such that the boundary surface will diffuse tracer light being emitted outwardly therefrom. Diffusion of the outwardly emitted tracer light may assist with eye safety and may generally expand the beam of the emitted tracer light for increased visibility by a technician. In the illustrated embodiment, the boundary surface 88 is recessed with respect to a forward face 92 of the tracer light interface 68. Setting back the boundary surface 88 may help protect the boundary surface 88 from damage. Recessing the boundary surface 88 also creates guide walls 94 that may facilitate the desired positioning of the launch tool 16 (FIG. 1) for effectively conducting tracer light into the light pipe 64. The plurality of diffusing protrusions 90 may extend around a central, substantially planer portion 96 of the boundary surface 88. The guide walls 94 may extend around and define an outwardly open guiding cavity for receiving and aligning a tip of the launch tool 16 (FIG. 1) so that the tracer light emitted from the launch tool is coaxially aligned with the central, substantially planer portion 96 of the boundary surface 88. When present, this alignment seeks to minimize any diffusion of the inwardly traveling tracer light by the boundary surface 88.

As alluded to above, the light pipe 64 may be tapered outwardly along the optical path P from the tracing optical fiber interface 66 to the tracer light interface 68. As a result, the tracing optical fiber interface 66, particularly the boundary 70, may be appropriately sized to mate with the tracing optical fiber 36 (FIG. 4). The tracing optical fiber 36 receives and emits light through a relatively small cross sectional area. The tracer light interface 68, on the other hand, may emit tracer light from a relatively large area, such as large of an area as reasonably possible to more easily identify the illuminated end of the cable 12. In other words, the light pipe 64 may be tapered such that a profile of the tracing optical fiber interface 66 perpendicular to the optical path P is smaller than a profile of the tracer light interface 68 perpendicular to the optical path.

One skilled in the art will understand that FIGS. 5 and 6 illustrate a light pipe 64 according to only one embodiment. The light pipe 64 illustrated is designed for a cable 12 with one tracing optical fiber 36, and therefore includes a single tracing optical fiber interface 66. Additional tracing optical fiber interfaces 66 may be present in other embodiments, especially in embodiments where the cable 12 may contain two or more tracing optical fibers 36. Furthermore, although the illustrated light pipe 64 has two tracer light interfaces 68, the light pipe 64 may alternatively be designed with a single tracer light interface 68. In one example, a single tracer light interface may be created by generally omitting half of the light pipe 64 as defined by the symmetry axis S. Such an embodiment with a single tracer light interface may free additional space within the connector housing 42 for wider sweeping geometries, thereby relaxing the bend constraints upon the light pipe 64. In other embodiments, the light pipe 64 may have two or more tracer light interfaces 68, but may be asymmetric, having optical paths of different configurations. Accordingly, light pipes 64 of the present disclosure are not limited to embodiments having only one or two tracer light interfaces 68. Providing a light pipe 64 with more than one tracer light interface 68, and thereby providing more than one launch point 60 per connector 26 (FIG. 3), may enhance access for the technician attempting to selectively inject light from the launch tool 16 (FIG. 1) through the cable 12 via one of the tracer light interfaces 68. Similarly, having a connector 26 with several illuminated tracer light interfaces 68 may enhance visibility of the end of the cable 12 in situations where one illumination point may be otherwise blocked from view behind the connector 26.

Light pipes 64 of the present disclosure may be substantially rigid waveguides. The example embodiment of the light pipe 64 comprises, consists essentially of, or consists of a solid body of transparent material, but hollow light pipes are also contemplated. In the example embodiment, the light pipe 64 has a polygonal cross section. In other embodiments, some or all cross sections of the light pipe 64 perpendicular to the optical path P may be substantially circular or other shapes. In the example embodiment, the light pipe 64 of the present disclosure is a waveguide whose structure is distinct from the elongated, flexible nature of a tracing optical fiber 36 as found along the cable 12. In other words, as used herein, the light pipe 64 is not merely an end portion of the tracing optical fiber 36. Specific use of the light pipe 64, as compared to an end portion of an optical fiber, may provide more design freedom and increased performance for injecting the tracer light and maximizing the illumination area for visual identification at an opposing connector 26. The light pipe 64 may provide an improved ability to route a visible optical tracing signal within the tight spatial constraints encountered within the connector 26. General optical design guidelines for light guides suggest using a bend radius greater than twice the diameter of the light guide. These guidelines result in a much tighter acceptable bend radius than may be reliably achievable with optical fiber.

Routing a terminal end of the tracing optical fiber 36 through the connector 26 may provide limited optical paths that maintain limited-loss light transmission. Use of the tracing optical fiber 26 itself as the visual identification point results in only a small emission point of the tracer light at the distal end of the fiber. The light pipe 64, on the other hand, may take a number of different geometries above and beyond the configuration shown in FIGS. 5 and 6, producing a variety of optical path configurations, to conduct the tracer light from the tracer light interface 68 to the tracing optical fiber interface 66 and vice versa. Therefore, in certain embodiments, the light pipe 64 may be advantageously used when the light pipe creates an optical path that is non-linear. Further, the light pipe 64 may be advantageous when the optical path P turns the light at least about ninety degrees from the tracer light interface 68 to the tracing optical fiber interface 66. In the illustrated embodiment, tracer light following the optical path P would substantially complete about a 180-degree turn, in effect having an emission direction substantially parallel and opposite to the receiving direction.

The traceability of traceable cable assemblies may be fulfilled by injecting tracer light at a launch point 60 located near one end of the cable assembly to produce subsequent illumination on the opposing end of the cable assembly. In other words, in one example, tracer light is launched into the tracer light interface 68 of a first light pipe 64 associated with a connector 26 on one end of the cable 12. Then, a second light pipe (not show) associated with another connector 26 on the opposite end of the cable 12 may become visibly illuminated. In this embodiment, either end of the cable assembly may selectively serve as the source end or the launch end for tracer light. In some embodiments, the tracer light is provided by the external launch tool 16. In other embodiments, a light source 18 may be integrated into a portion of the cable assembly, such as the connector 26.

As mentioned above, the light pipe 64 may serve as either the entire illuminated area or partially contribute to the identification of the connector 26 by providing one or more areas of the light pipe 64 along the optical path P that allow tracer light to escape from the periphery of the light pipe 64 to be visible for tracing purposes though indicia 62 (FIG. 3) or other transparent or translucent portions of the connector housing 42. To intentionally emit light from the peripheral surfaces of the light pipe 64 other than or in addition to the boundary surfaces 88, one or more of several techniques may be used. For example, the light pipe 64 may be a diffusive waveguide formed from a body of translucent material or a material having air bubbles or other internal structures configured to scatter light. Alternatively, the peripheral surface of the light pipe 64 may be modified in whole or at discrete locations to create scattering sites by adding particles (e.g., titanium oxide) to or roughening the peripheral surface. Light pipes configured to emit light from portions other than the tracer light interface 68 may be included in some embodiments of cable assemblies and connectors of this disclosure.

Figure 7:
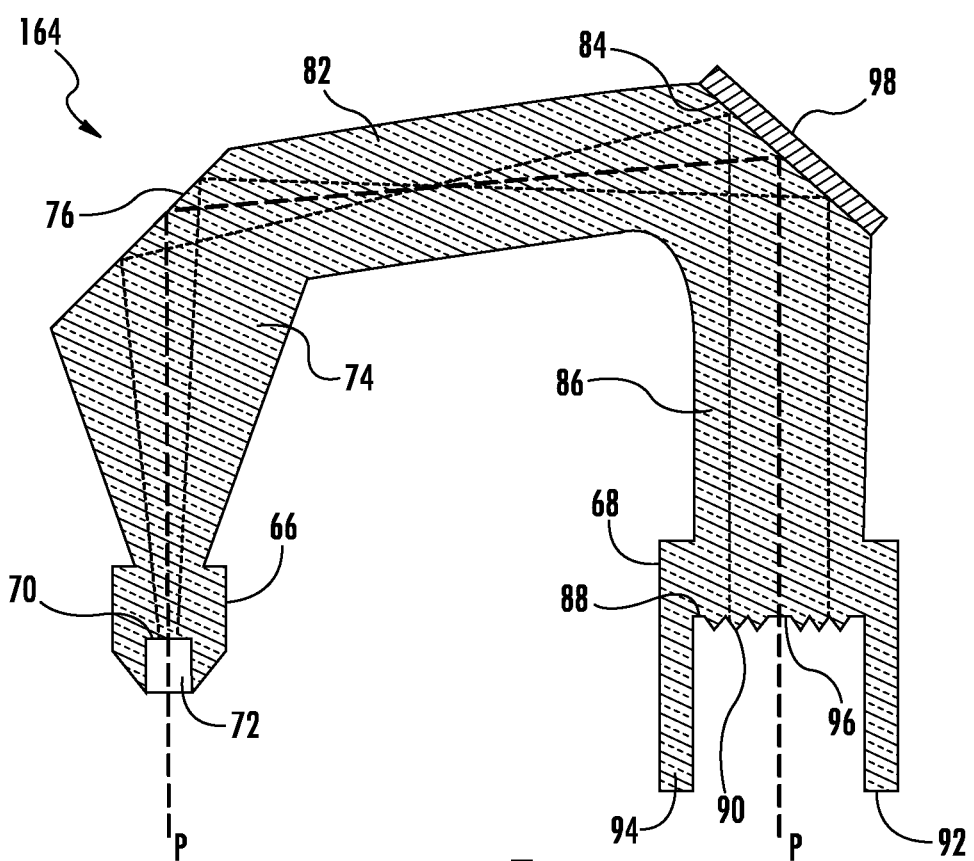
FIG. 7 is a schematic of tracer light passing through a light pipe according to an embodiment.

FIG. 7 schematically shows an optical path P through another light pipe 164 that eliminates the bending curve of the second transition portion 84 shown in FIGS. 5 and 6 in exchange for a planar surface that may reflect the tracer light (see light rays shown) using total internal reflection principles or by providing a mirror coating 98 mounted in a predetermined position associated with the second transition portion 84 on the exterior surface of the body of the light pipe 164. Otherwise, FIG. 7 illustrates a light pipe 164 that may have several features similar to the light pipe 64 of FIGS. 4-6, the notable exception being the presence of only a single tracer light interface 68.

Designing the shape and selecting the material of the light pipe 64 to operate substantially under the principles of total internal reflection along the length of the light pipe is often sufficient for providing a light pipe that effectively contains and transmits tracer light for the purposes of the present systems. Modifications to the light pipe 64, however, may be made to increase the ability for the light pipe to contain tracer light and avoid unintended losses from the peripheral surface thereof. For example, the first and second transition portions 76, 84, (i.e. those portions of the light pipe intended to bend the optical path) may be provided with a mirror coating on the exterior of the body of the light pipe 64, such as an opaque mirror layer to reflect any light that may escape the light pine, or a cladding layer, configured to help maintain light within the light pipe by increasing the differences in refractive index at the boundary between the body and the cladding. Further, a mirror or cladding layer does not have to be confined to the first and second transition portions 76, 84 but may be selectively provided on some or all of the peripheral surfaces of the light pipe 64 where loss of tracer light would be undesired.

The light pipe 64, 164 may be a substantially solid injection molded part made from optically transparent material. Using injection molding may help provide high volume manufacturing with relatively low cost. Other manufacturing methods such as additive manufacturing may be used. Molding the light pipe 64, 164 may produce a monolithic part that can also include attachment or alignment features, such as the projections 100 (FIG. 5) that may be used to fix the position of the light pipe 64 within the connector housing. The projection 100 may mate with a recess in a portion of the connector housing 42 (FIG. 4). The light pipe 64, 164 could also have a recess or other similar portion to act as an alignment feature corresponding with the connector housing.

Persons skilled in waveguide technology will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

We claim:
1. A cable assembly, comprising:
   a traceable cable, comprising:
      at least one data transmission element,
      a jacket at least partially surrounding the at least one data transmission element, and
      a tracing optical fiber incorporated with and extending along at least a portion of a length of the traceable cable, wherein the tracing optical fiber includes a core having a first index of refraction and a cladding with a second index of refraction; and
   at least one connector coupled to an end of the traceable cable, the at least one connector comprising:
      a connector housing, and
      a light pipe positioned at least partially within the connector housing, the light pipe comprising:
         at least one tracing optical fiber interface optically coupled to the tracing optical fiber, and at least one tracer light interface optically accessible from outside of the connector housing, wherein the light pipe defines an optical path configured to direct tracer light from the at least one tracing optical fiber interface to the at least one tracer light interface, and wherein the at least one tracer light interface is configured to receive and emit the tracer light directed by the optical path, wherein the light pipe includes a reflection surface in the optical path so that the optical path is configured to reflect the tracer light at least once when directing the tracer light from the at least one tracing optical fiber interface to the at least one tracer light interface.

2. The cable assembly of claim 1, wherein the optical path is configured to turn the tracer light through substantially 180 degrees when directing the tracer light from the at least one tracing optical fiber interface to the at least one tracer light interface.

3. The cable assembly of claim 1, wherein:
the at least one tracer light interface comprises a diffusive boundary surface comprising a plurality of prisms and a planar central portion, the diffusive boundary surface configured to diffuse at least a portion of the tracer light emitted from the at least one tracer light interface.

4. The cable assembly of claim 1, wherein the light pipe is tapered such that a profile of the at least one tracing optical fiber interface perpendicular to the optical path is smaller than a profile of the at least one tracer light interface perpendicular to the optical path.

5. The cable assembly of claim 1, wherein the reflection surface is configured to reflect the tracer light by total internal reflection.

6. The cable assembly of claim 1, wherein the reflection surface comprises a mirror coating connected to the light pipe and configured to reflect the tracer light.

7. The cable assembly of claim 1, wherein:
the at least one tracing optical fiber interface comprises a single tracing optical fiber interface;
the at least one tracer light interface comprises at least two tracer light interfaces;
the light pipe further comprises an optical splitter; and
the optical path is configured to direct tracer light from the single tracing optical fiber interface to the at least two tracer light interfaces via the optical splitter.

8. The cable assembly of claim 1, wherein the optical path includes at least one turn.

9. The cable assembly of claim 1, wherein the light pipe is a solid body of transparent material.

10. The cable assembly of claim 1, wherein the light pipe comprises a diffusive waveguide so that the light pipe is configured to emit the tracer light directed by the optical path at one or more areas along the optical path.

11. The cable assembly of claim 10, wherein:
the connector housing comprises indicia in optical communication with the light pipe and configured to be illuminated by the tracer light when the tracer light is directed by the optical path.

12. The cable assembly of claim 10, wherein at least a portion of the connector housing is formed from a material that is either or both translucent and transparent such that the light pipe can be seen through the connector housing when the optical path directs the tracer light.

13. The cable assembly of claim 1, wherein:
the at least one data transmission element comprises a pair of data transmission elements;

the connector housing comprises a duplex connector housing having an upper housing and a lower housing; and
the light pipe is at least partially positioned between the lower housing and upper housing.

14. A connector for a traceable cable having a tracing optical fiber, comprising:
a connector housing; and
a light pipe positioned at least partially within the connector housing, the light pipe comprising:
at least one tracing optical fiber interface configured to be optically coupled to the tracing optical fiber, and
at least one tracer light interface optically accessible from outside of the connector housing,
wherein the light pipe defines an optical path configured to direct tracer light from the at least one tracing optical fiber interface to the at least one tracer light interface, and wherein the at least one tracer light interface is configured to receive and emit the tracer light directed by the optical path,
wherein the at least one tracer light interface comprises a diffusive boundary surface comprising a plurality of prisms and a planar central portion, the diffusive boundary surface configured to diffuse at least a portion of the tracer light emitted from the at least one tracer light interface.

15. The connector of claim 14, wherein the optical path includes at least one turn.

16. The connector of claim 14, wherein the optical path is configured to turn the tracer light through substantially 180 degrees when directing the tracer light from the at least one tracing optical fiber interface to the at least one tracer light interface.

17. The connector of claim 14, wherein the light pipe is tapered such a profile of the at least one tracing optical fiber interface perpendicular to the optical path is smaller than a profile of the at least one tracer light interface perpendicular to the optical path.

18. The connector of claim 14, wherein: the light pipe is a solid body of transparent material.

19. The connector of claim 14, wherein:
the light pipe comprises a diffusive waveguide so that the light pipe is configured to emit the tracer light directed by the optical path at one or more areas along the optical path.

20. The connector of claim 19, wherein:
the connector housing comprises indicia configured to be illuminated by the tracer light when the tracer light is directed by the optical path.

21. The connector of claim 19, wherein at least a portion of the connector housing is formed from a material that is at least one of translucent and transparent such that the light pipe can be seen through the connector housing when the optical path directs the tracer light.

22. The connector of claim 14, wherein:
the at least one tracing optical fiber interface comprises a single tracing optical fiber interface;
the at least one tracer light interface comprises at least two tracer light interfaces;
the light pipe further comprises an optical splitter; and
the optical path is configured to direct tracer light from the single tracing optical fiber interface to the at least two tracer light interfaces via the optical splitter.

23. A traceable cable, comprising:
at least one data transmission element;
a jacket at least partially surrounding the at least one data transmission element;

a tracing optical fiber incorporated with and extending along at least a portion of a length of the cable, wherein the tracing optical fiber includes a core having a first index of refraction and a cladding with a second index of refraction; and at least one launch point for optically accessing the tracing optical fiber, the launch point comprising a light pipe, the light pipe comprising:

a tracing optical fiber interface optically coupling the light pipe to the tracing optical fiber; and at least one tracer light interface optically accessible from outside of the traceable cable, wherein:

the light pipe defines an optical path configured to direct tracer light from the at least one tracing optical fiber interface to the at least one tracer light interface;

the at least one tracer light interface is configured to receive and emit the tracer light directed by the optical path; and the optical path has at least one turn, wherein the light pipe includes a reflection surface in the optical path so that the optical path is configured to reflect the tracer light at least once when directing the tracer light from the at least one tracing optical fiber interface to the at least one tracer light interface.

* * * * *

UNITED STATES PATENT AND TRADEMARK OFFICE
CERTIFICATE OF CORRECTION

PATENT NO. : 10,101,545 B2
APPLICATION NO. : 15/286156
DATED : October 16, 2018
INVENTOR(S) : Micah Colen Isenhour et al.

Page 1 of 1

It is certified that error appears in the above-identified patent and that said Letters Patent is hereby corrected as shown below:

On the Title Page

Column 1, item (72), Inventors, Lines 2-3, delete "China Grovbe," and insert -- China Grove, --, therefor.

Column 2, item (56), other publications, Line 2, delete "Dec. 29, 2016." and insert -- Dec. 19, 2016. --, therefor.

On page 3, Column 2, item (56), foreign patent documents, Line 33, delete "0011484" and insert -- 2000011484 --, therefor.

On page 3, Column 2, item (56), foreign patent documents, Line 34, delete "02095289" and insert -- 2002095289 --, therefor.

On page 4, Column 1, item (56), other publications, Line 14, delete ""Characterizaion" and insert -- "Characterization --, therefor.

On page 4, Column 1, item (56), other publications, Line 14, delete "Emmitting Polymeric" and insert -- Emitting Polymeric --, therefor.

On page 4, Column 1, item (56), other publications, Line 15, delete "Jounal" and insert -- Journal --, therefor.

On page 4, Column 2, item (56), other publications, Line 7, delete "Galvonameters," and insert -- Galvanometers, --, therefor.

On page 4, Column 2, item (56), other publications, Line 23, delete "http//" and insert -- http:// --, therefor.

Signed and Sealed this
Eighth Day of September, 2020

Andrei Iancu
*Director of the United States Patent and Trademark Office*